US008777439B2

(12) United States Patent
    Kuromizu

(10) Patent No.: US 8,777,439 B2
(45) Date of Patent: Jul. 15, 2014

(54) ILLUMINATING DEVICE, DISPLAY DEVICE, AND TELEVISION RECEIVING DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/822,003

(22) PCT Filed: Jul. 28, 2011

(86) PCT No.: PCT/JP2011/067310
    § 371 (c)(1),
    (2), (4) Date: Mar. 11, 2013

(87) PCT Pub. No.: WO2012/039196
    PCT Pub. Date: Mar. 29, 2012

(65) Prior Publication Data
    US 2013/0169886 A1    Jul. 4, 2013

(30) Foreign Application Priority Data
    Sep. 22, 2010  (JP) .................... 2010-211897

(51) Int. Cl.
    *G02F 1/00*       (2006.01)
    *G02F 1/1335*     (2006.01)
(52) U.S. Cl.
    CPC ........ *G02F 1/133608* (2013.01); *G02B 6/0081* (2013.01)
    USPC ......................................... 362/97.4; 362/633
(58) Field of Classification Search
    USPC .......................... 362/633, 634, 97.4
    See application file for complete search history.

(56) References Cited

U.S. PATENT DOCUMENTS

| 5,211,464 | A | * | 5/1993 | Bohmer ..................... 362/634 |
| 5,729,310 | A | * | 3/1998 | Horiuchi et al. ............. 349/62 |
| 6,502,945 | B2 | * | 1/2003 | Kim et al. .................. 362/27 |
| 2002/0008806 | A1 | | 1/2002 | Natsuyama |
| 2009/0073338 | A1 | * | 3/2009 | Jeong ........................ 349/58 |
| 2009/0103328 | A1 | * | 4/2009 | Iwasaki ..................... 362/617 |

FOREIGN PATENT DOCUMENTS

| JP | 06-186432 A | 7/1994 |
| JP | 06-342603 A | 12/1994 |
| JP | 2002-042535 A | 2/2002 |
| JP | 2009-158233 A | 7/2009 |

OTHER PUBLICATIONS

Official Communication issued in International Patent Application No. PCT/JP2011/067310, mailed on Oct. 18, 2011.

* cited by examiner

*Primary Examiner* — Laura Tso
(74) *Attorney, Agent, or Firm* — Keating & Bennett, LLP

(57) ABSTRACT

Provided is an illuminating device capable of positioning or fixing a light guide plate in a chassis while preventing intensity distribution in a plane of light emitted from a front face of the plate from becoming nonuniform. An illuminating device (4) includes a plate-shaped light guide plate (11), a box-shaped chassis (14) with its upper face open and arranged to house the plate, a frame-shaped frame (5) extending along an outer peripheral end portion of the plate and attached to an upper side of the chassis, and a light source (21) arranged to project light onto a predetermined lateral end face (11a) of the plate, wherein the frame includes a presser member (6) disposed on its lower face (5b) and arranged to sandwich the plate between the presser member and the chassis, and wherein the plate includes an engagement member (12) arranged to engage with the presser member.

15 Claims, 11 Drawing Sheets

ILLUMINATING DEVICE, DISPLAY DEVICE, AND TELEVISION RECEIVING DEVICE

TECHNICAL FIELD

The present invention relates to an illuminating device, a display device, and a television receiving device.

BACKGROUND ART

In these years, liquid crystal display devices are in widespread use as displays for household electrical appliances such as computers and television receiving devices. A general liquid crystal display device includes a liquid crystal display panel, and an illuminating device that is disposed behind the display panel so as to project light onto the display panel. A side-light (or edge-light) type illuminating device that includes a light guide plate, and a light source that is disposed along one side or a plurality of sides of the light guide plate is known as this type of illuminating device. The side-light illuminating device having this configuration has the advantage of being easily reduced in thickness, compared with a direct illuminating device having a configuration that a light source is disposed behind a liquid crystal display panel.

A general light guide plate is a transparent plate having a given thickness, which is made from an acrylate resin. The general light guide plate planarly diffuses light from a light source, which has entered from its lateral end face (light entrance face), on its front face (light exit face). The light guide plate needs to be positioned or fixed in a box-shaped chassis included in an illuminating device so as not to be displaced or not to fall off. However, a mechanism or a structure to position or fix the light guide plate in the chassis should not cause nonuniform in-plane intensity distribution of the light emitted from the front face of the light guide plate. For example, PTL 1 discloses a configuration to fix a light guide plate in a chassis.

Disclosed in PTL 1 is the configuration that the light guide plate includes a through hole or a notch in a plate thickness direction on its outer peripheral end portion, and that a chassis that houses the light guide plate includes a protrusion or a column. The through hole or the notch of the light guide plate engages with the protrusion or the column of the chassis, whereby the light guide plate is positioned or fixed in the chassis.

CITATION LIST

Patent Literature

PTL 1: JP H06-186432

SUMMARY OF INVENTION

Technical Problem

However, in the configuration of PTL1, the through hole or notch provided in the plate thickness direction on the outer peripheral end portion of the light guide plate and the protrusion or column which engages with the through hole/notch, exist through the thickness of the light guide plate. They hinder the light that enters the light guide plate from a light source to cause nonuniform in-plane intensity distribution of the light emitted from a front face of the light guide plate. Consequently, a problem that luminance unevenness could develop in images displayed on a liquid crystal display panel arises.

An object of the present invention is to provide an illuminating device, a display device, and a television receiving device, which are capable of positioning or fixing a light guide plate in a chassis while preventing nonuniform in-plane intensity distribution of light emitted from a front face of the light guide plate housed in a chassis.

Solution to Problem

To achieve the objects and in accordance with the purpose of the present invention, an illuminating device of the present invention includes a light guide plate having a plate shape, a chassis having a box shape with its upper face open and arranged to house the light guide plate, a frame having a frame shape extending along an outer peripheral end portion of the light guide plate and attached to an upper side of the chassis, and a light source for projecting light onto a predetermined lateral end face of the light guide plate, wherein the frame includes a presser member which is disposed on its lower face and sandwiches the light guide plate between the presser member and the chassis, and wherein the light guide plate includes an engagement member which engages with the presser member.

With this configuration, the engagement member of the light guide plate and the presser member of the frame that engages with the engagement member can be disposed so as not to exist through the thickness of the light guide plate, which can prevent the engagement member and the presser member from hindering the light that enters the light guide plate from the light source. Thus, the illuminating device is capable of positioning or fixing the light guide plate in the chassis while preventing nonuniform in-plane intensity distribution of the light emitted from a front face of the light guide plate.

It is preferable that the presser member comprises an elastic member, or an elastic member fixed to the lower face of the frame and a plate fixed to a lower side of the elastic member, or an elastic contact piece that is in elastic contact with the engagement member. With this configuration, the presser member of the frame elastically latches onto the light guide plate, so that the illuminating device is capable of preventing the light guide plate from rattling in the chassis due to vibrations.

In addition, it is preferable that the frame further includes a resin sheet attached thereto, which has surface roughness larger than that of the lower face of the frame, and is disposed close to the presser member on the lower face of the frame. With this configuration, the sheet on the lower face of the frame is in contact with the light guide plate to function as a slip resistant member, so that the illuminating device is capable of preventing the light guide plate from rattling in the chassis due to vibrations.

Further, it is preferable that each of the presser member and the engagement member has a strip shape extending along a longitudinal direction of an end portion of the light guide plate. With this configuration, the light guide plate can be more strongly positioned or fixed in the chassis.

Examples of the shapes of the presser member of the frame and the engagement member of the light guide plate include a round shape, an oval shape, a triangular shape, a quadrangular shape and a hexagonal shape when seen in a plan view. Examples of the color of an outer surface of the presser member on the lower face of the frame include a whitish color when the light from the light source should be reflected, and a black color when the light from the light source should not be reflected more than necessary (unnecessarily).

In another aspect of the present invention, a display device of the present invention includes the illuminating device described above, and a display panel that makes a display by using light emitted from the illuminating device. Having this configuration, the display device of the present invention is capable of preventing nonuniform in-plane intensity distribution of the light projected onto the back side of the display panel, and is accordingly capable of achieving an image display with no or minimum quality loss.

The examples of the display panel include a liquid crystal display panel. The examples of the display device include a liquid crystal display device, and the liquid crystal display device can be applied to various uses, such as a display for a television receiving device and a display for a personal computer. In particular, the liquid crystal display device can be preferably applied to a large-screen display.

Advantageous Effects of Invention

According to the present invention, the illuminating device, the display device, and the television receiving device are capable of positioning or fixing the light guide plate in the chassis while preventing nonuniform in-plane intensity distribution of the light emitted from the front face of the light guide plate housed in the chassis, and are accordingly capable of achieving an image display with no or minimum quality loss.

BRIEF DESCRIPTION OF DRAWINGS

FIG. 6A is a side view showing the frame consistent with the first modification. FIG. 6B is a side view showing the frame consistent with the second modification. FIG. 6C is a side view showing the frame consistent with the third modification.

FIG. 7A is a plan view showing the light guide plate seen from the front side. FIG. 7B is a plan view showing the frame seen from the back side.

FIG. 8A is a plan view showing the light guide plate seen from the front side. FIG. 8B is a plan view showing the frame seen from the back side.

FIG. 9A is a plan view showing the light guide plate seen from the front side. FIG. 9B is a plan view showing the frame seen from the back side.

FIG. 10A is a plan view showing the light guide plate seen from the front side. FIG. 10B is a plan view showing the frame seen from the back side.

FIG. 11A is a plan view showing the light guide plate seen from the front side. FIG. 11B is a plan view showing the frame seen from the back side.

DESCRIPTION OF EMBODIMENTS

Detailed descriptions of preferred embodiments of an illuminating device, a display device, and a television receiving device of the present invention will now be provided with reference to the accompanying drawings.

Figure 1:
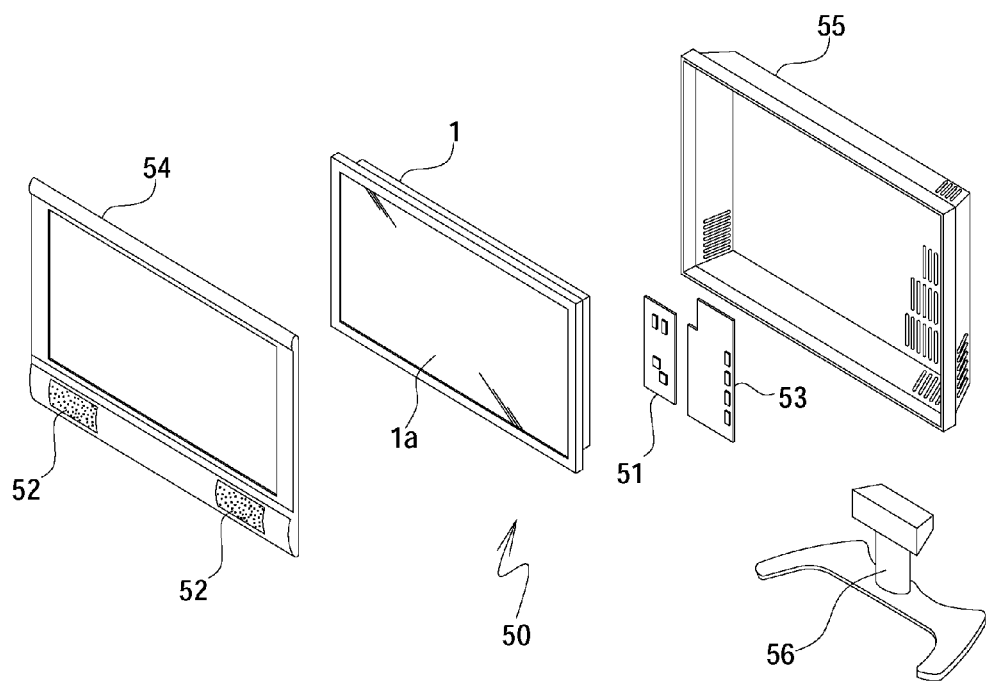
FIG. 1 is an exploded perspective view showing a schematic configuration of a television receiving device of a preferred embodiment of the present invention.

FIG. 1 is an exploded perspective view showing a schematic configuration of the television receiving device of the present embodiment. A television receiving device 50 includes a liquid crystal display device 1, a tuner 51, speakers 52, and a power board 53 that supplies electric power to the liquid crystal display device 1, the tuner 51, and the speakers 52. The liquid crystal display device 1, the tuner 51, the speakers 52 and the power board 53 are housed in a housing consisting of a front side cabinet 54 and a back side cabinet 55, which are supported by a stand 56. The liquid crystal display device 1 is housed in an upright position such that a display surface 1a of the liquid crystal display device 1 is oriented vertically.

Figure 2:
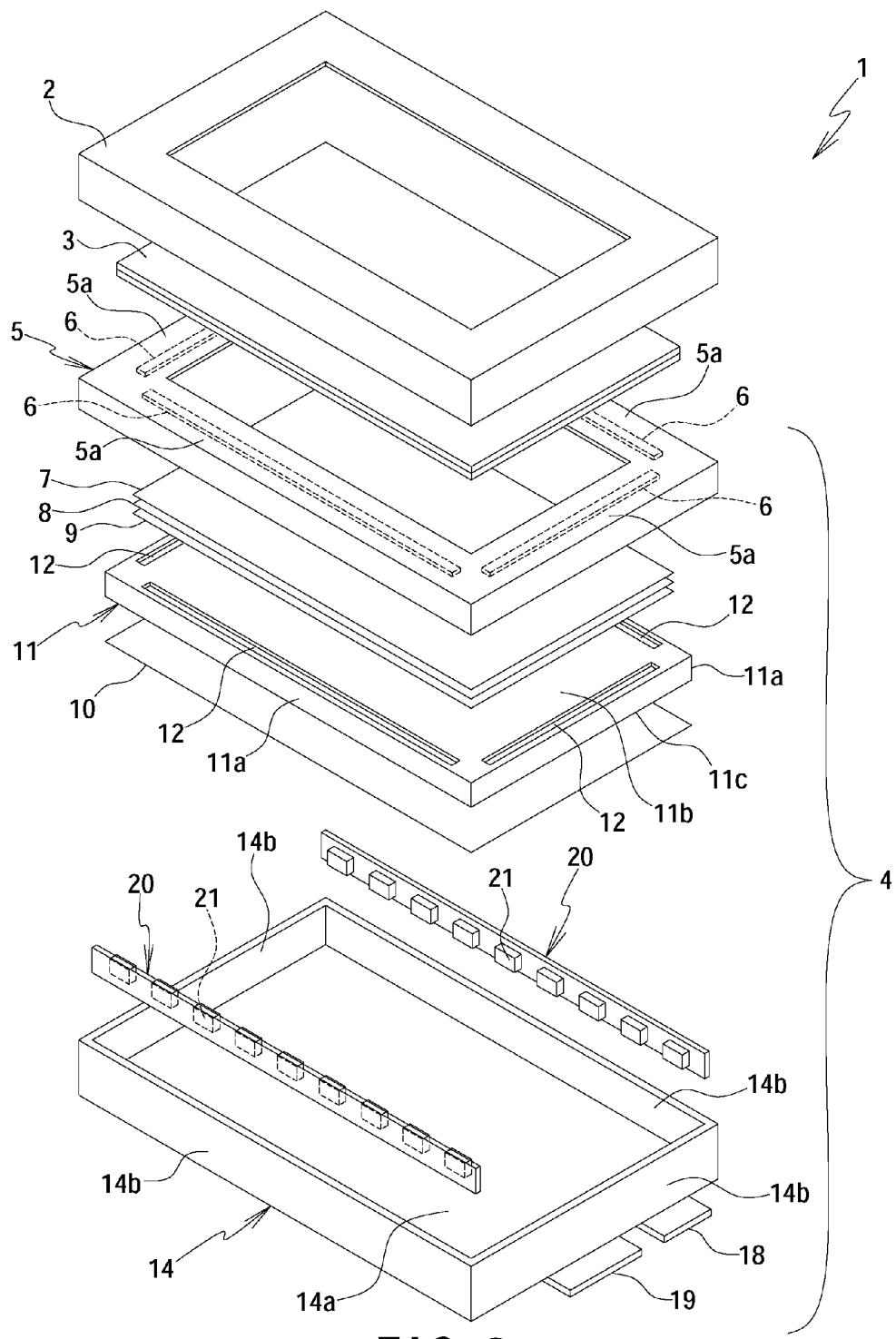
FIG. 2 is an exploded perspective view showing a schematic configuration of a liquid crystal display device included in the television receiving device shown in FIG. 1.
Figure 3:
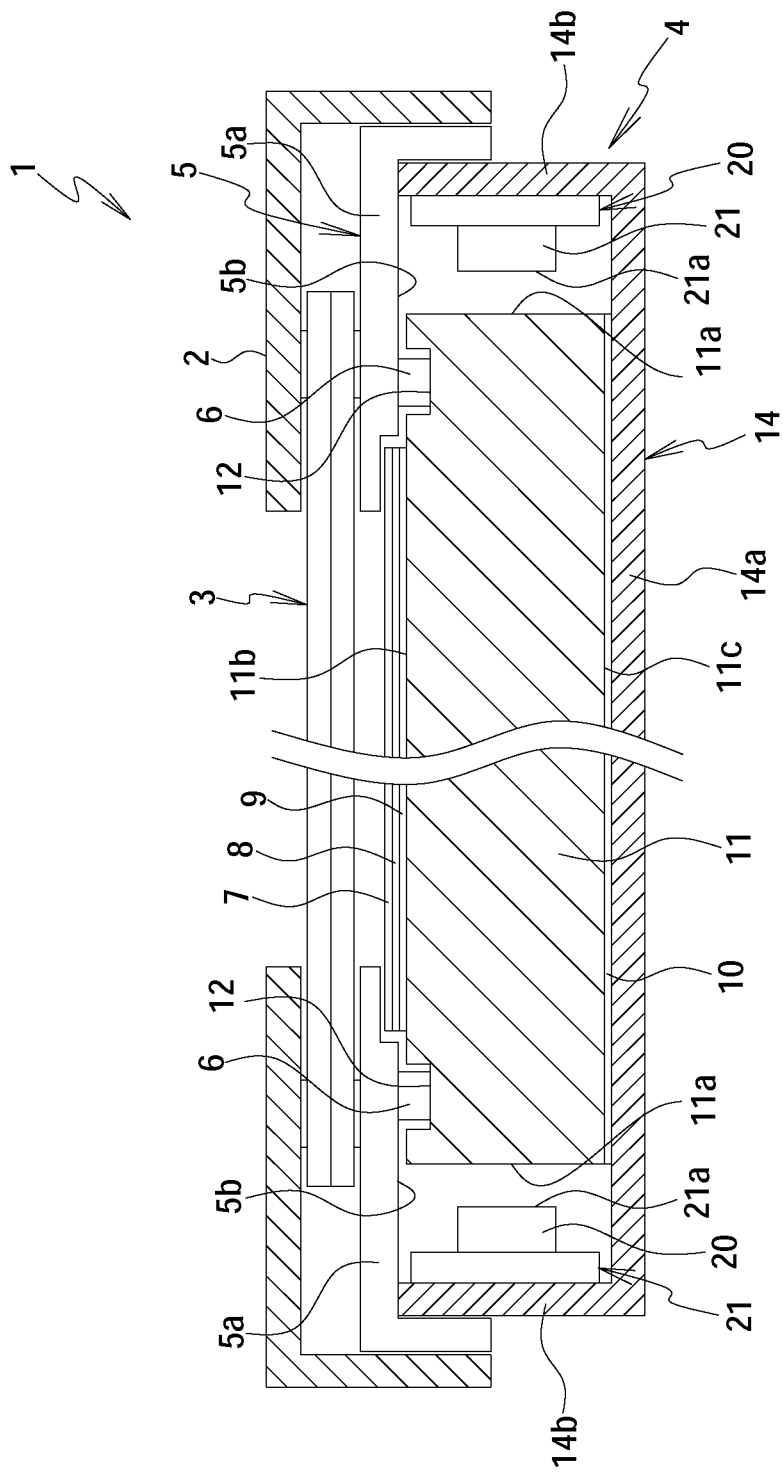
FIG. 3 is a cross-sectional view showing a cross-sectional configuration along a short side direction of the assembled liquid crystal display device shown in FIG. 2.
Figure 4:
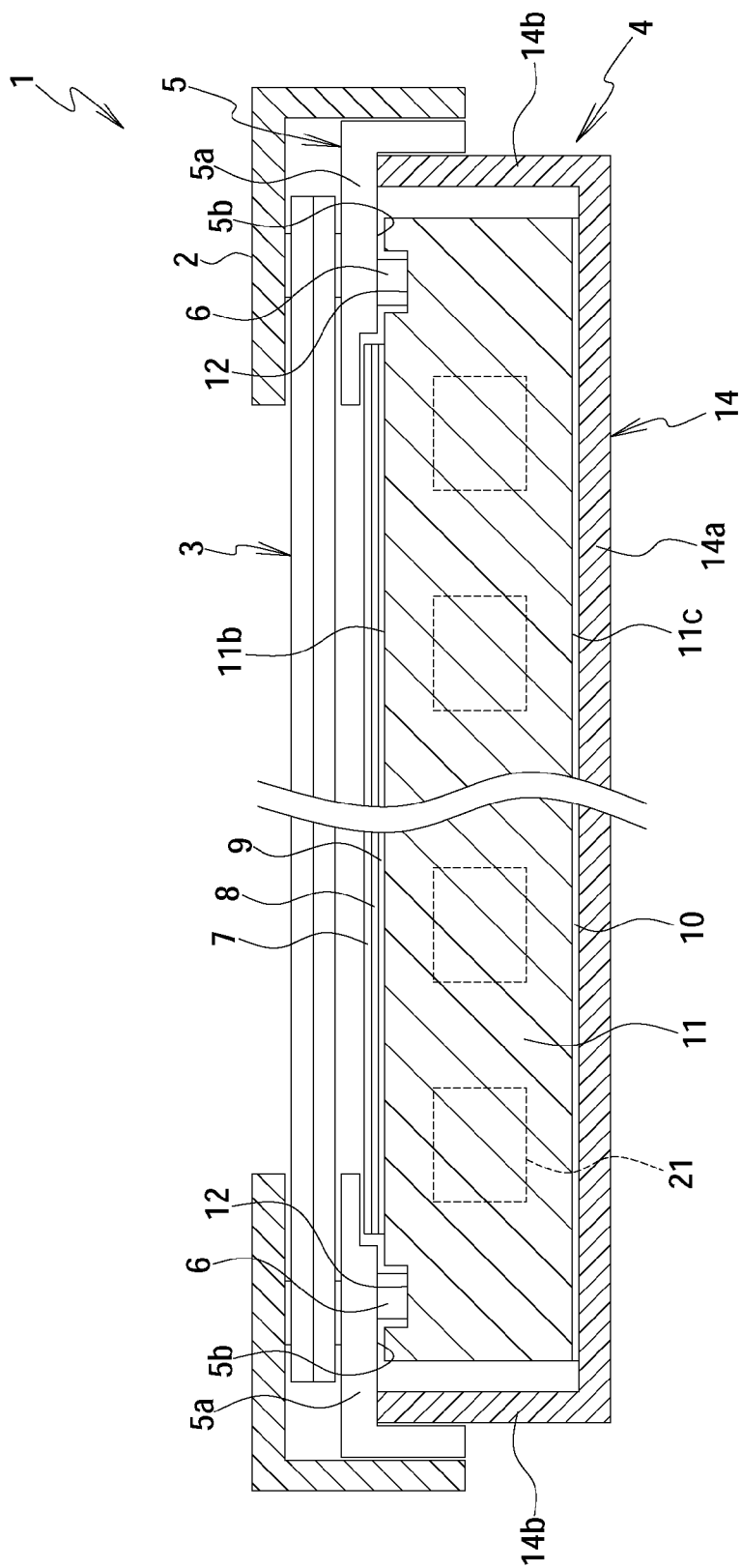
FIG. 4 is a cross-sectional view showing a cross-sectional configuration along a long side direction of the assembled liquid crystal display device shown in FIG. 2.

The liquid crystal display device 1 includes a liquid crystal display panel 3, and an illuminating device (backlight device) 4 that projects light onto the liquid crystal display panel 3, which are held together by a bezel 2 having a frame shape as shown in FIGS. 2, 3 and 4. The bezel 2 has a frame shape to cover the periphery of the liquid crystal display panel 3. The bezel 2, together with a chassis 14 of the illuminating device 4, ensures strength of the entire liquid crystal display device 1.

The liquid crystal display panel 3 has an oblong rectangular shape when seen in a plan view, and includes a pair of glass substrates consisting of a thin film transistor (TFT) array substrate and a color filter (CF) substrate, which are bonded together so as to be opposed parallel to each other having a given space therebetween. Between the glass substrates, liquid crystals are filled.

A plurality of TFTs and pixel electrodes are arranged in a matrix on the TFT array substrate. A plurality of color patterns are arranged in a matrix on the CF substrate, and a common electrode is provided over the entire surface of the CF substrate. Orientation of the liquid crystals can be controlled by varying a voltage applied between the pixel electrodes and the common electrode, whereby an image can be displayed. The liquid crystal display panel 3 includes polarizing plates on its front face and back face.

The illuminating device 4 is a so-called side-light (or edge-light) illuminating device. The illuminating device 4 includes the box-shaped chassis 14 that has an opening facing the liquid crystal display panel 3, and optical sheets 7-9 disposed over the opening of the chassis 14 as shown in FIG. 2. In addition, the chassis 14 includes LED boards 20 on each of which a plurality of LEDs (Light Emitting Diodes) 21 that work as a light source are mounted, a light guide plate 11 guides light emitted from the LEDs 21 to the liquid crystal display panel 3, and a reflection sheet 10 disposed behind the light guide plate 11, which are housed inside of the chassis 14.

The frame 5 fixes the optical sheets 7-9, the light guide plate 11 and the reflection sheet 10, which are stacked in this order from the top, to the chassis 14. In the present embodiment, the frame 5 has a frame shape extending along outer peripheral end portions of the light guide plate 11, and is capable of pressing the almost entire outer peripheral end portions of the optical sheets 7-9 and the light guide plate 11 from the front side. The frame 5 is made preferably of a black synthetic resin, and has a light shielding effect. The frame 5 supports the back faces of the outer peripheral end portions of the liquid crystal display panel 3 on the front faces of its frame portions 5a.

The chassis 14 has the shape of a box of low height and is prepared preferably by bending a metal plate made from aluminum. The chassis 14 is arranged to house the optical sheets 7-9, the light guide plate 11, the reflection sheet 10, and the LED boards 20. The chassis 14 includes a bottom plate 14a having an oblong rectangular shape when seen in a plan view, and side plates 14b that stand on the four sides of the outer edge of the bottom plate 14a. The side plates 14b have a configuration that the frame 5 and the bezel 2 can be attached thereto with screws.

The three optical sheets 7-9 consist of thin resin sheets, which have an oblong rectangular shape when seen in a plan view. The three optical sheets 7-9 are disposed on the front side of the light guide plate 11 (the side from which light exits) and lie between the liquid crystal display panel 3 and the light guide plate 11. For example, a polarization selective reflection sheet 7, a lens sheet 8 and a diffusion sheet 9, which have thicknesses of about 0.1 to 0.5 mm, are stacked in this order from the top.

In the present embodiment, the diffusion sheet 9 diffuses the light emitted from the light guide plate 11, allowing uniformalization of luminance distribution of the light. The lens sheet 8 gathers the light that is emitted from the diffusion sheet 9 to enhance the front luminance of the light. The polarization selective reflection sheet 7 selectively reflects the light emitted from the lens sheet 8 so that the light is not absorbed by a polarizing plate (not illustrated) that is attached on the back side of the liquid crystal display panel 3.

The light guide plate 11 has an oblong rectangular shape when seen in a plan view, and is preferably made of a transparent resin plate having a thickness of about 3 to 4 mm. The light guide plate 11 includes light entrance faces 11a through which light emitted from the LEDs 21 enters, and a light exit face 11b from which the light that has entered from the light entrance faces 11a exits upward (in a direction of light projection). The light entrance faces 11a is defined by lateral end faces on long sides of the light guide plate 11. The light exit face 11b is defined by the front face of the light guide plate 11.

The light that has entered the light guide plate 11 through the light entrance face 11a is diffused planarly inside the plate 11 while repeatedly reflected between the light exit face (front face) 11b and back face 11c which is an opposite face of the light exit face 11b. The light guide plate 11 includes a plurality of scattering members (not illustrated) on the back face 11c, which scatter the light, which has entered through the light entrance faces 11a, and emit the light from light exit face 11b. The scattering members are preferably provided by dotting paint containing a white pigment on the back face 11c of the light guide plate 11 in a printing method.

The plurality of LEDs 21 mounted on the LED boards 20 are disposed close to the light entrance faces 11a of the light guide plate 11. Each of the LEDs 21 has a package structure such that an LED chip that emits blue light is encapsulated in a transparent resin into which a yellow fluorescent material is mixed, for example. Thus, the LEDs 21 are capable of emitting white light from light emitting faces 21a. The LEDs 21 are spaced apart from each other at specified intervals along the light entrance faces 11a such that the light emitting faces 21a of the LEDs 21 oppose the light entrance faces 11a of the light guide plate 11. In the present embodiment, the two LED boards 20 are disposed such that the light emitting faces 21a of the LEDs 21 oppose the lateral end faces (light entrance faces 11a) on the long sides of the light guide plate 11.

The reflection sheet 10 is disposed so as to cover the back face 11c of the light guide plate 11, which is the opposite face to the light exit face 11b of the light guide plate 11. In the present embodiment, the reflection sheet 10 is disposed on the bottom plate 14a of the chassis 14. The reflection sheet 10 reflects back the light emitted out through the back face 11c of the light guide plate 11 into the light guide plate 11. For example, the reflection sheet 10 is made of a resin sheet having a thickness of about 0.1 to 2 mm. In the present embodiment, the front face of the reflection sheet 10 is painted white so as to effectively reflect the light emitted from the back face 11c toward the side of the light guide plate 11, so that the use efficiency of the light can be improved to enhance the luminance of the light on the light exit face 11b of the light guide plate 11.

Thus, since the illuminating device 4 includes the optical sheets 7-9, the light guide plate 11 and the reflection sheet 10, the illuminating device 4 projects the light emitted from the LEDs 21 onto the back face of the liquid crystal display panel 3 while converting the light to have a planar distribution. A power board 18 to supply power to the LED boards 20, and a control board 19 to drive the liquid crystal display panel 3 are provided behind the chassis 4.

In the illuminating device 4, presser members (protrusions) 6 disposed on lower faces 5b of the frame 5, and engagement members (concave members) 12 that engage with the presser members 6 are disposed on the light guide plate 11, as shown in FIGS. 2, 3 and 4. The light guide plate 11 is held between the presser members 6 and the chassis 14.

Figure 5A:
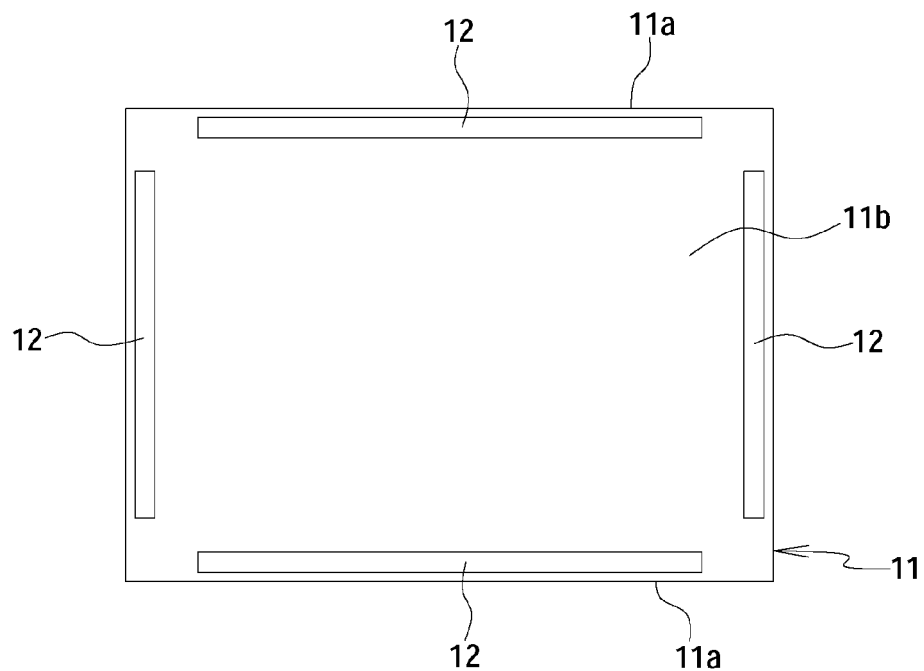
FIG. 5A is a plan view showing a light guide plate seen from the front side.

To be specific, the engagement members 12 are disposed so as to be dented downward at the outer peripheral end portions on the front face (light exit face) 11b of the light guide plate 11, that is, at the portions of the light guide plate 11 that are covered by the lower faces 5c of the frame portions 5a of the frame 5. In the present embodiment, the engagement members 12 are disposed at a total of four positions on the front faces at the end portions on the paired long sides and the paired short sides of the light guide plate 11. In addition, the engagement members 12 on the long sides of the light guide plate 11 are shorter than the long sides, and have strip shapes (oblong rectangular shapes) parallel to the long sides when seen in a plan view as shown in FIG. 5A. Likewise, the engagement members 12 on the short sides of the light guide plate 11 are shorter than the short sides, and have strip shapes (oblong rectangular shapes) parallel to the short sides when seen in a plan view as shown in FIG. 5A.

As members corresponding to the engagement members 12, the presser members 6 capable of engaging with (fitting into) the engagement members 12 are disposed protruding downward on the lower faces (back faces) 5b of the frame portions 5a of the frame 5 as shown in FIGS. 3 and 4.

Figure 5B:
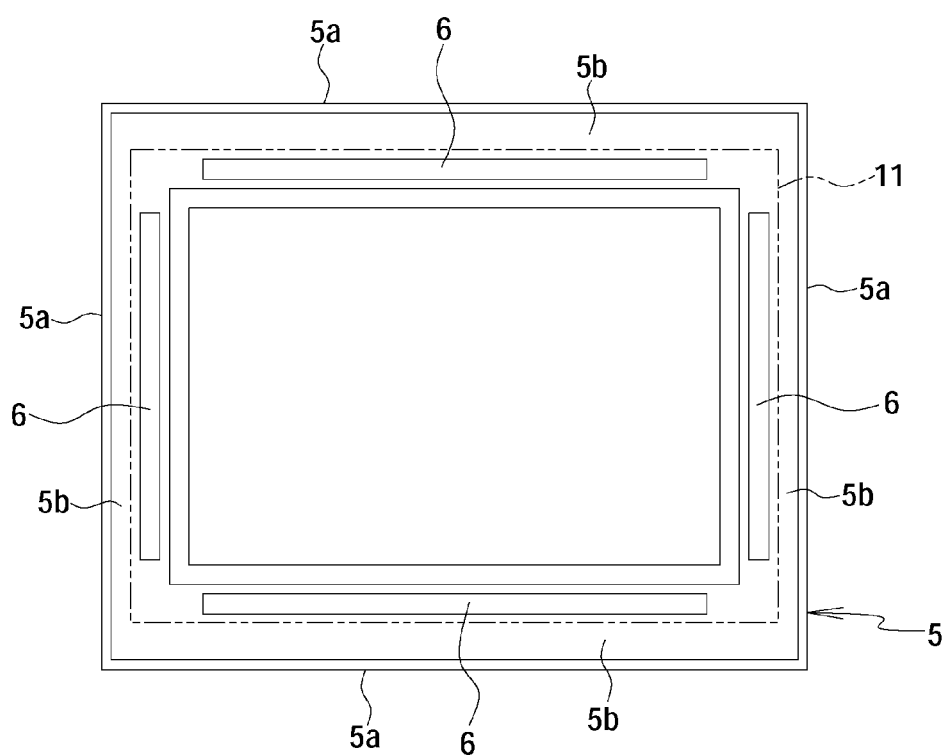
FIG. 5B is a plan view showing a frame seen from the back side.

The presser members 6 are also disposed at a total of four positions on the lower faces 5b of the frame portions 5a on the paired long sides and on the paired short sides of the frame 5 as shown in FIG. 5B. The presser members 6 have strip shapes (oblong rectangular shapes) along the longitudinal directions of the frame portions 5a.

In the present embodiment, the depth of the engagement members 12 and the length of the presser members 6 are much smaller than the thickness of the light guide plate 11 as shown in FIGS. 3 and 4 so as to prevent the engagement members 12 and the presser members 6 from hindering the light that enters the light guide plate 11. Thus, including the engagement members 12 of the light guide plate 11 and the presser members 6 of the frame 5 that engage with the engagement members 12, the illuminating device 4 is capable of easily positioning or fixing the light guide plate 11 in the chassis 14 while preventing nonuniform in-plane intensity distribution of the light emitted from the front face (light exit face) 11b of the light guide plate 11. Examples of the color of outer surfaces of the presser members 6 include a whitish color such as a white color and a cream color when the light from the LEDs 21 should be reflected, and a black color when the light from the LEDs 21 should not be reflected more than necessary (unnecessarily) to the contrary.

Next, descriptions of modifications of the presser members 6 on the lower faces 5b of the frame 5 described above will be provided.

Figure 6A:
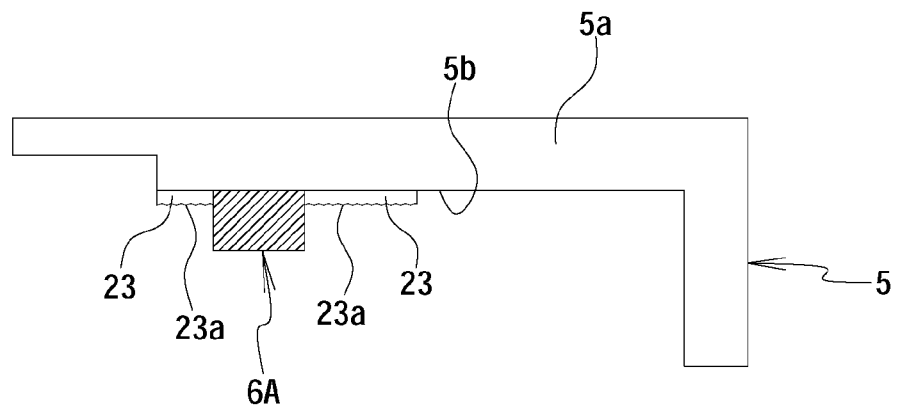
FIGS. 6A to 6C are views showing presser members of the first to third modifications that the frame includes.

FIG. 6A is a view showing a presser member 6A of the first modification that the frame 5 includes. The presser member 6A is a component separate from the frame 5 as shown in FIG. 6A, and is an elastic member that is made preferably of rubber. Thus, being the elastic members that are made preferably of rubber, the presser members 6A are in elastic contact with the engagement members 12 of the light guide plate 11 when engaging with (fitting into) the engagement members 12. With this configuration, the presser members 6A of the frame 5 elastically latch onto the light guide plate 11, so that the illuminating device 4 is capable of preventing the light guide plate 11 from rattling in the chassis 14 due to vibrations.

In this case, the frame 5 further includes resin sheets 23 attached thereto, which include surfaces 23a having surface roughness larger than that of the lower faces 5b of the frame 5, and are disposed close to (around) the presser members 6A on the lower faces 5b of the frame 5. With this configuration, the surfaces 23a of the sheets 23 on the lower faces 5b of the frame 5 are in contact with the light guide plate 11 to function as slip resistant members for the light guide plate 11, so that the illuminating device 4 is capable of preventing the light guide plate 11 from rattling in the chassis 14 due to vibrations.

Figure 6B:
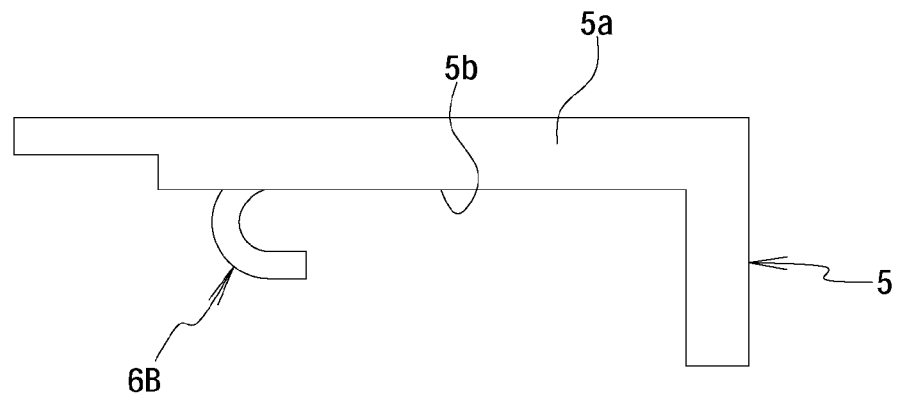

FIG. 6B is a view showing a presser member 6B of the second modification that the frame 5 includes. The presser member 6B is an elastic contact piece having the shape of a segment of a circle that protrudes downward from the lower face 5b of the frame 5 as shown in FIG. 6B, and is flexible and deformable upward and downward.

Thus, being the elastic contact pieces flexible and deformable upward and downward, the presser members 6B are in elastic contact with the engagement members 12 of the light guide plate 11 when engaging with (fitting into) the engagement members 12. With this configuration, the presser members 6B of the frame 5 elastically latch onto the light guide plate 11, so that the illuminating device 4 is capable of preventing the light guide plate 11 from rattling in the chassis 14 due to vibrations.

Figure 6C:
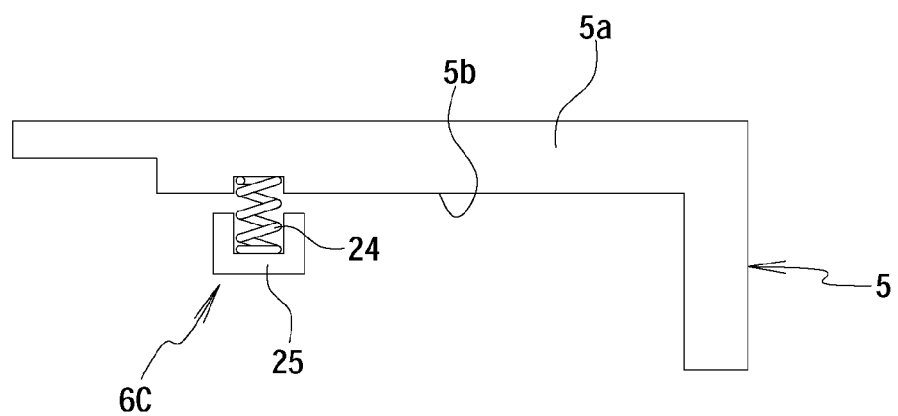

FIG. 6C is a view showing a presser member 6C of the third modification that the frame 5 includes. The presser member 6C is a member including a coil spring (elastic member) 24 of which the upper side (one end) is fixed to the lower face 5b of the frame 5, and a plate 25 that is fixed to the lower side (the other end) of the coil spring as shown in FIG. 6C. Thus, the plates 25 are in elastic contact with the engagement members 12 of the light guide plate 11 by being pressed downward by the coil springs 24 when engaging with (fitting into) the engagement members 12. With this configuration, the presser members 6C of the frame 5 elastically latch onto the light guide plate 11, so that the illuminating device 4 is capable of preventing the light guide plate 11 from rattling in the chassis 14 due to vibrations. It is also preferable to provide the sheets 23 shown in FIG. 6A so as to be attached to the frame 5 close to the presser members 6B shown in FIG. 6B or the presser members 6C shown in FIG. 6C.

Described above is the configuration that the engagement members 12 of the light guide plate 11 and the presser members 6 of the frame 5 have the long strip shapes (rectangular shapes) when seen in a plan view as shown in FIGS. 5A and 5B; however, it is also preferable that the engagement members 12 of the light guide plate 11 and the presser members 6 of the frame 5 have the shapes of the fourth to eighth modifications to be described below.

Figure 7A:
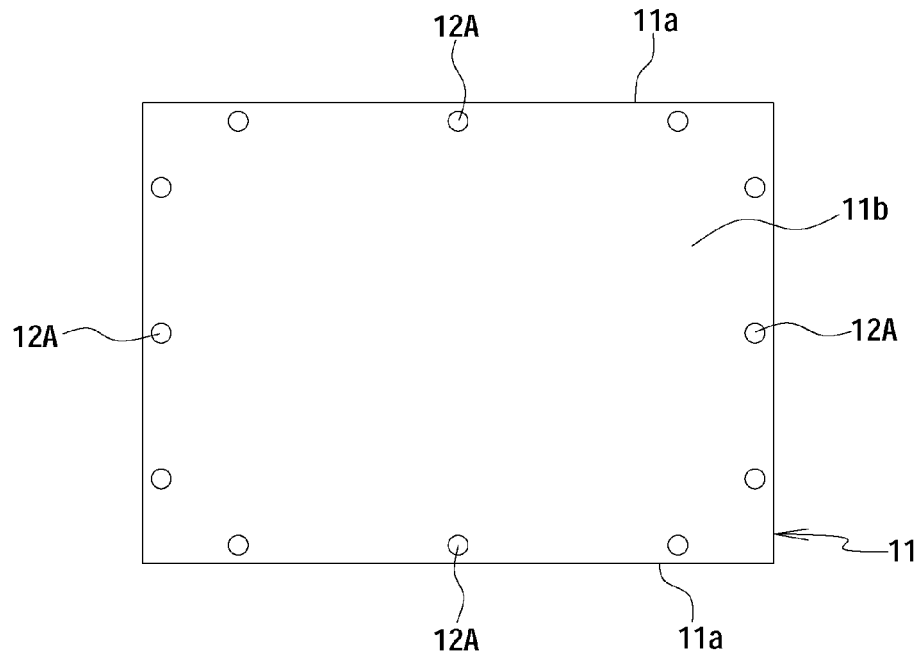
FIGS. 7A and 7B are views showing the light guide plate and the frame consistent with the fourth modification.
Figure 7B:
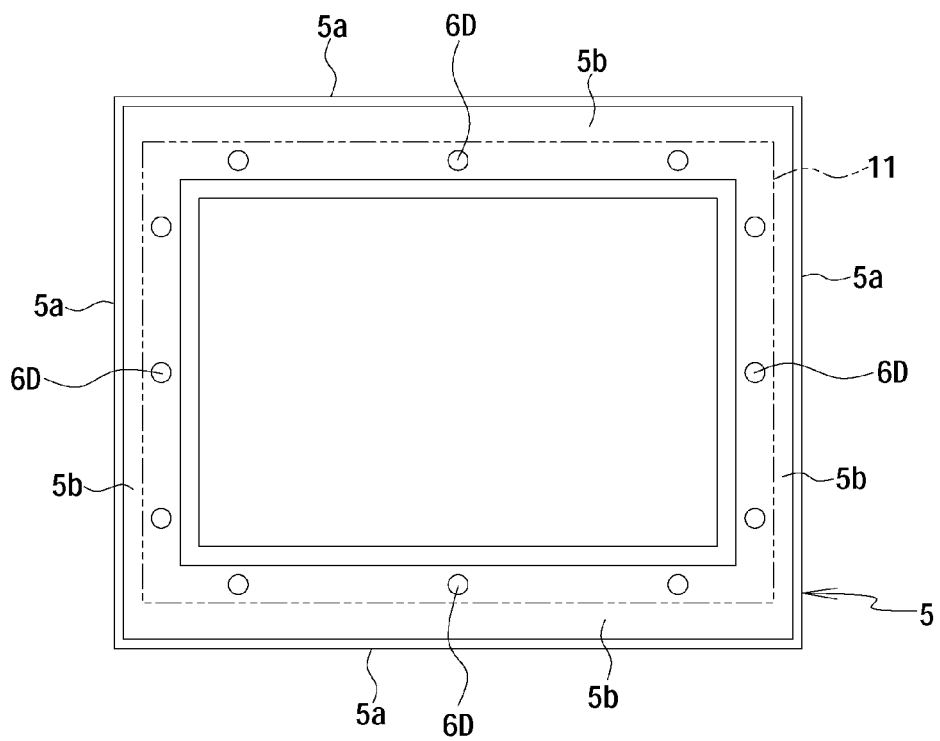

FIGS. 7A and 7B are views showing engagement members 12A of the fourth modification that the light guide plate 11 includes, and presser members 6D of the fourth modification that the frame 5 includes. The plurality of engagement members 12A that have a round shape when seen in a plan view are disposed on the front face (light exit face) 11b at the end portions thereof along the longitudinal directions of the four sides of the light guide plate 11 as shown in FIG. 7A. In addition, the plurality of presser members 6D that have a round shape when seen in a plan view are disposed along the longitudinal directions of the frame portions 5a on the lower faces 5b of the frame portions 5a on the four sides of the frame 5 so as to correspond to the engagement members 12A of the light guide plate 11 as shown in FIG. 7B.

Figure 8A:
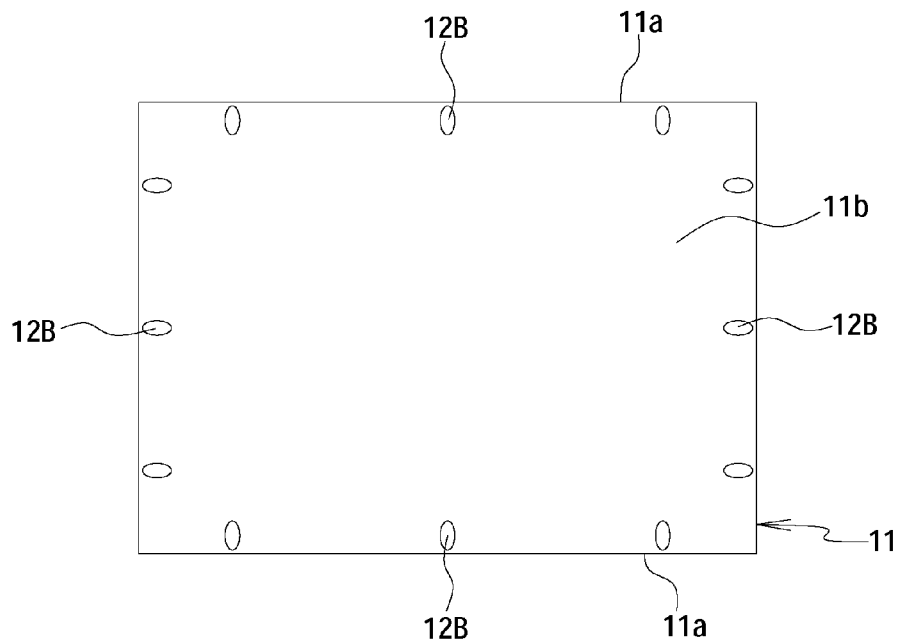
FIGS. 8A and 8B are views showing the light guide plate and the frame consistent with the fifth modification.
Figure 8B:
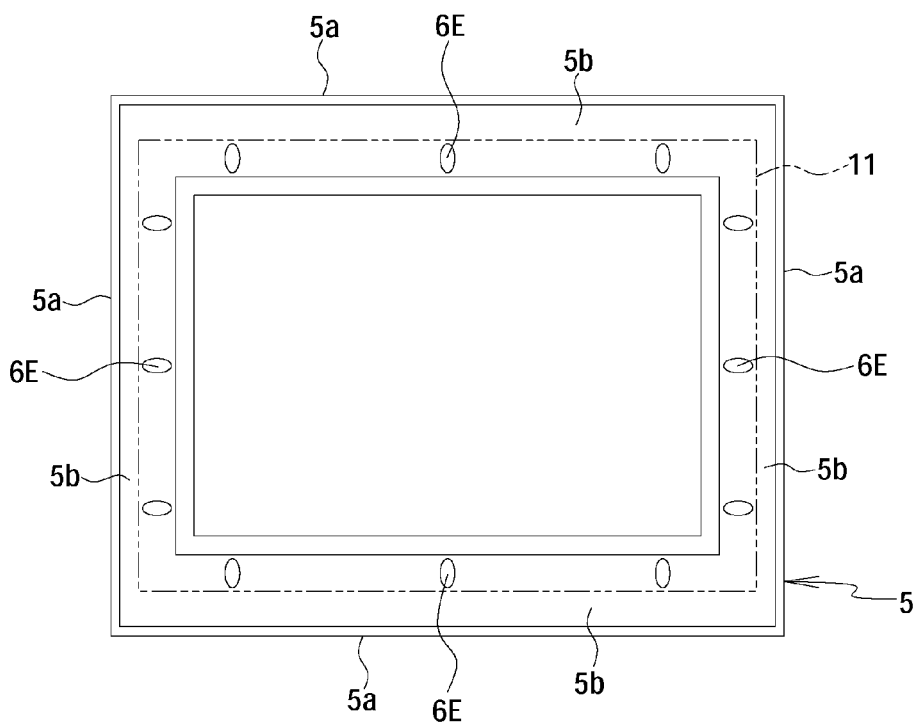

FIGS. 8A and 8B are views showing engagement members 12B of the fifth modification that the light guide plate 11 includes, and presser members 6E of the fifth modification that the frame 5 includes. The plurality of engagement members 12B that have an oval shape when seen in a plan view are disposed on the front face (light exit face) 11b at the end portions thereof along the longitudinal directions of the four sides of the light guide plate 11 as shown in FIG. 8A. In addition, the plurality of presser members 6E that have an oval shape when seen in a plan view are disposed along the longitudinal directions of the frame portions 5a on the lower faces 5b of the frame portions 5a on the four sides of the frame 5 so as to correspond to the engagement members 12B of the light guide plate 11 as shown in FIG. 8B.

Figure 9A:
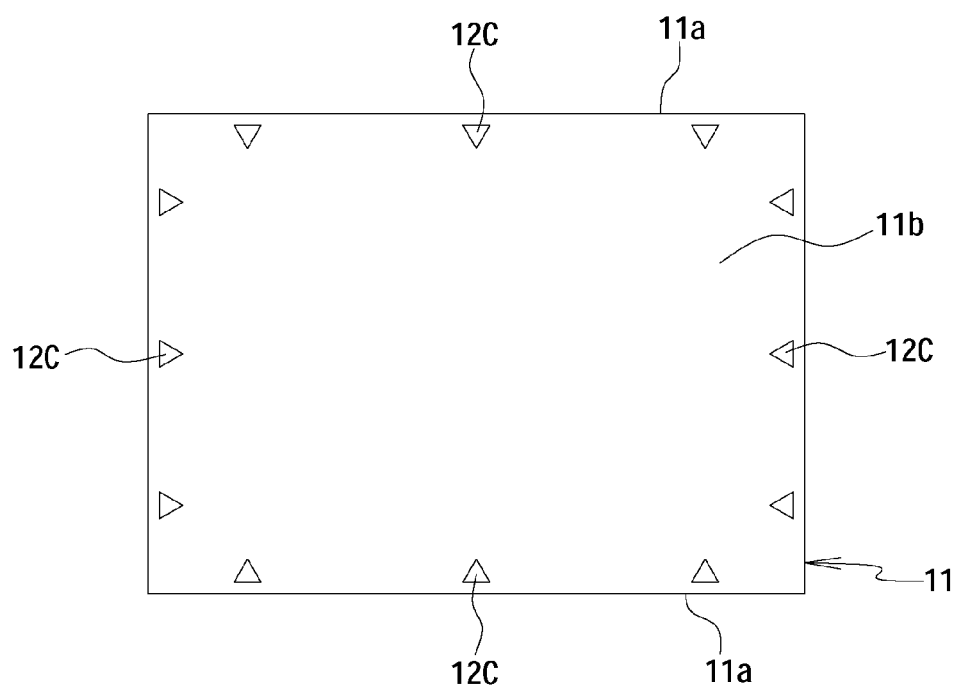
FIGS. 9A and 9B are views showing the light guide plate and the frame consistent with the sixth modification.
Figure 9B:
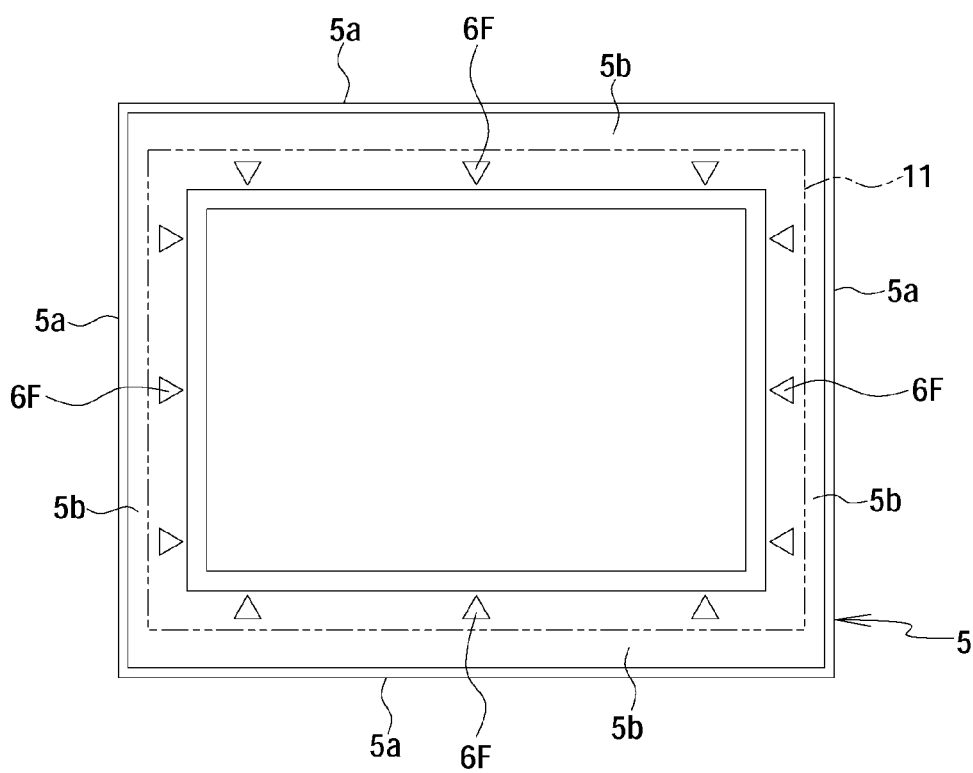

FIGS. 9A and 9B are views showing engagement members 12C of the sixth modification that the light guide plate 11 includes, and presser members 6F of the sixth modification that the frame 5 includes. The plurality of engagement members 12C that have a triangular shape when seen in a plan view are disposed on the front face (light exit face) 11b at the end portions thereof along the longitudinal directions of the four sides of the light guide plate 11 as shown in FIG. 9A. In addition, the plurality of presser members 6F that have a triangular shape when seen in a plan view are disposed along the longitudinal directions of the frame portions 5a on the lower faces 5b of the frame portions 5a on the four sides of the frame 5 so as to correspond to the engagement members 12C of the light guide plate 11 as shown in FIG. 9B.

Figure 10A:
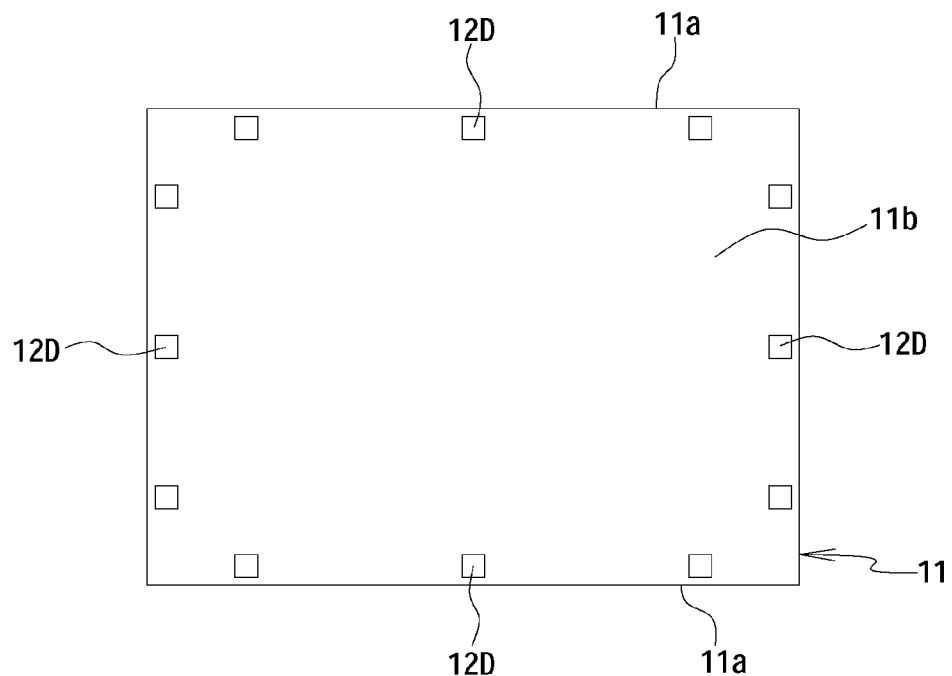
FIGS. 10A and 10B are views showing the light guide plate and the frame consistent with the seventh modification.
Figure 10B:
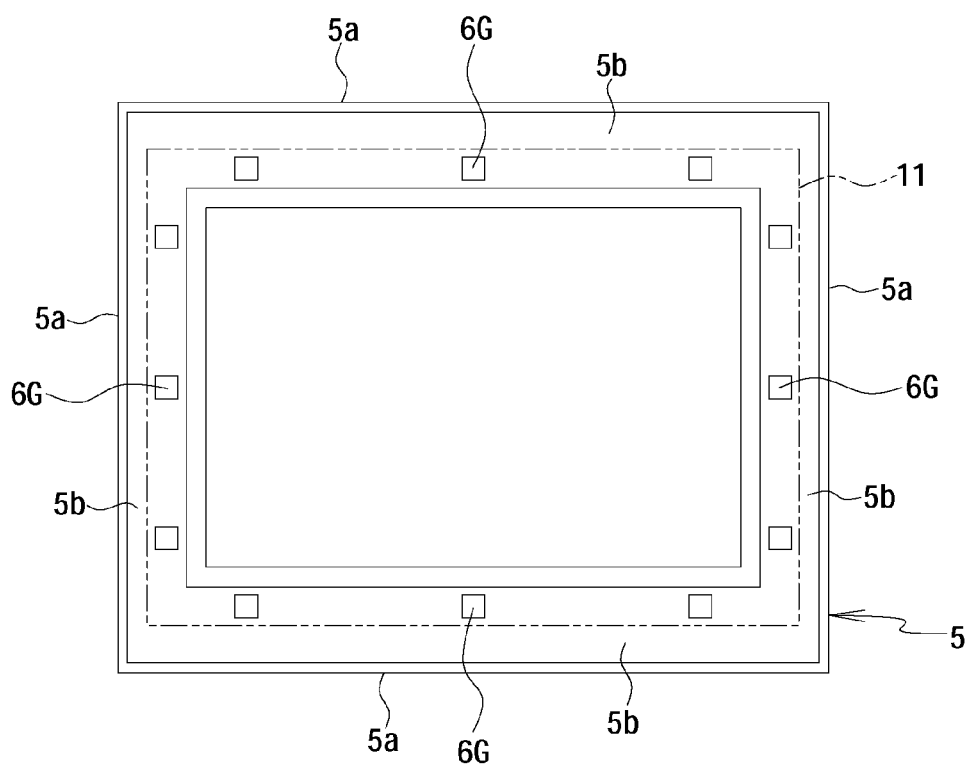

FIGS. 10A and 10B are views showing engagement members 12D of the seventh modification that the light guide plate 11 includes, and presser members 6G of the seventh modification that the frame 5 includes. The plurality of engagement members 12D that have a quadrangular shape when seen in a plan view are disposed on the front face (light exit face) 11b at the end portions thereof along the longitudinal directions of the four sides of the light guide plate 11 as shown in FIG. 10A. In addition, the plurality of presser members 6G that have a quadrangular shape when seen in a plan view are disposed along the longitudinal directions of the frame portions 5a on the lower faces 5b of the frame portions 5a on the four sides of the frame 5 so as to correspond to the engagement members 12D of the light guide plate 11 as shown in FIG. 10B.

Figure 11A:
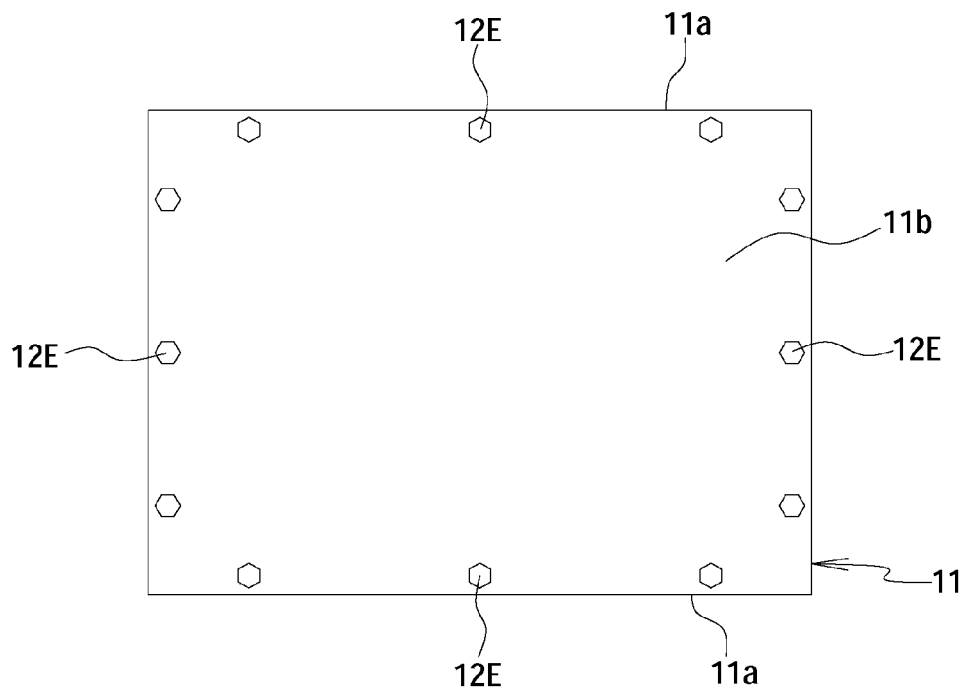
FIGS. 11A and 11B are views showing the light guide plate and the frame consistent with the eighth modification.
Figure 11B:
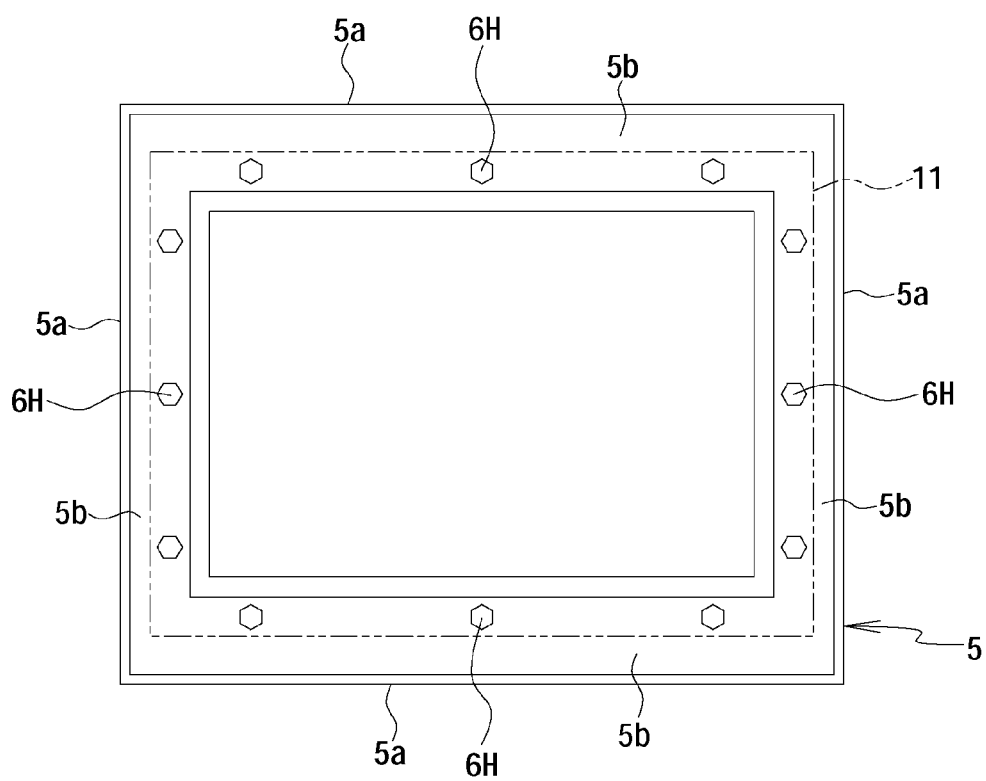

FIGS. 11A and 11B are views showing engagement members 12E of the eighth modification that the light guide plate 11 includes, and presser members 6H of the eighth modification that the frame 5 includes. The plurality of engagement members 12E that have a hexagonal shape when seen in a plan view are disposed on the front face (light exit face) 11b at the end portions thereof along the longitudinal directions of the four sides of the light guide plate 11 as shown in FIG. 11A. In addition, the plurality of presser members 6H that have a hexagonal shape when seen in a plan view are disposed along the longitudinal directions of the frame portions 5a on the lower faces 5b of the frame portions 5a on the four sides of the frame 5 so as to correspond to the engagement members 12E of the light guide plate 11 as shown in FIG. 11B. It is also preferable to apply the configurations of the presser members 6A to 6C and the sheets 23 shown in FIGS. 6A to 6C to the presser members 6D to 6E Shown in FIGS. 7B to 11B.

As described above, the engagement members 12 (12A to 12E) of the light guide plate 11 and the presser members 6 (6A to 6H) of the frame 5 that engage with the engagement members 12 (12A to 12E) can be disposed so as not to exist through the thickness of the light guide plate 11, which can prevent the engagement members 12 (12A to 12E) and the presser members 6 (6A to 6H) from hindering the light that enters the light guide plate 11 from the light source such as the LEDs 21. Thus, the illuminating device 4 of the present invention is capable of positioning or fixing the light guide plate 11 in the chassis 14 while preventing nonuniform in-plane intensity distribution of the light emitted from the front face (light exit face) 11b of the light guide plate.

The foregoing description of the preferred embodiments of the present invention has been presented for purposes of illustration and description with reference to the drawings. However, it is not intended to limit the present invention to the embodiments, and modifications and variations are possible as long as they do not deviate from the principles of the present invention. For example, described in the above-described embodiments is the configuration that the engagement members are disposed on all the sides of the rectangular light guide plate while the presser members are disposed on the frame portions on all the sides of the frame-shaped frame; however, it is also preferable that the engagement members are disposed only on the paired long sides of the light guide plate while the presser members are disposed on the frame portions on the paired long sides of the frame so as to correspond to the engagement members.

In addition, it is also preferable that the engagement members are disposed only on the paired short sides of the light guide plate while the presser members are disposed on the frame portions on the paired short sides of the frame so as to correspond to the engagement members. It is also preferable that the engagement members are disposed on one long side and one short side of the light guide plate while the presser members are disposed on the frame portions on one long side and one short side of the frame so as to correspond to the engagement members. The present invention is not limited to the embodiments described above.

The invention claimed is:

1. An illuminating device comprising:
a light guide plate having a plate shape;
a chassis having a box shape with its upper face open, and arranged to house the light guide plate;
a frame having a frame shape extending along an outer peripheral end portion of the light guide plate, and arranged to be attached to an upper side of the chassis; and
a light source arranged to project light onto a predetermined lateral end face of the light guide plate, wherein
the frame comprises a presser member disposed on its lower face, and arranged to sandwich the light guide plate between the presser member and the chassis,
the light guide plate comprises an engagement member arranged to engage with the presser member, and
the presser member comprises an elastic member.

2. The illuminating device according to claim 1, wherein the elastic member is fixed to the lower face of the frame; and
a plate is fixed to a lower side of the elastic member.

3. The illuminating device according to claim 1, wherein the elastic member includes an elastic contact piece that is in elastic contact with the engagement member.

4. The illuminating device according to claim 1, wherein the frame further comprises a resin sheet attached thereto, which has surface roughness larger than that of the lower face of the frame, and is disposed close to the presser member on the lower face of the frame.

5. The illuminating device according to claim 1, wherein each of the presser member and the engagement member has a strip shape extending along a longitudinal direction of an end portion of the light guide plate.

6. The illuminating device according to f claim 1, wherein each of the presser member and the engagement member has a round shape when seen in a plan view.

7. The illuminating device according to claim 1, wherein each of the presser member and the engagement member has an oval shape when seen in a plan view.

8. The illuminating device according to claim 1, wherein each of the presser member and the engagement member has a triangular shape when seen in a plan view.

9. The illuminating device according to claim 1, wherein each of the presser member and the engagement member has a quadrangular shape when seen in a plan view.

10. The illuminating device according to claim 1, wherein each of the presser member and the engagement member has a hexagonal shape when seen in a plan view.

11. The illuminating device according to claim 1, wherein an outer surface of the presser member has a whitish color.

12. The illuminating device according to claim 1, wherein an outer surface of the presser member has a black color.

13. A display device comprising:
the illuminating device according to claim 1; and
a display panel arranged to make a display by using light emitted from the illuminating device.

14. The display device according to claim 13,
wherein the display panel comprises a liquid crystal display panel comprising a pair of substrates, and liquid crystals filled between the substrates.

15. A television receiving device that comprises the display device according to claim 13.

* * * * *